May 10, 1966     T. J. WEIR     3,250,355

REMOTE CONTROL FLUID COUPLING

Filed Dec. 16, 1963     2 Sheets-Sheet 1

INVENTOR.
THOMAS J. WEIR
BY
Lockwood, Woodard, Smith & Weikart
Attorneys

May 10, 1966 T. J. WEIR 3,250,355
REMOTE CONTROL FLUID COUPLING
Filed Dec. 16, 1963 2 Sheets-Sheet 2

INVENTOR.
THOMAS J. WEIR
BY
Lockwood, Woodard, Smith & Weikart
Attorneys

United States Patent Office 3,250,355
Patented May 10, 1966

3,250,355
REMOTE CONTROL FLUID COUPLING
Thomas J. Weir, Indianapolis, Ind., assignor to Schwitzer Corporation, Indianapolis, Ind., a corporation of Indiana
Filed Dec. 16, 1963, Ser. No. 330,689
5 Claims. (Cl. 192—58)

This invention relates generally to fluid coupling devices and more particularly, to such devices wherein the degree of coupling may be varied and controlled by electrical means and/or by electrical means in combination with heat responsive devices.

Automotive vehicles, such as passenger automobiles and buses are now being provided with air conditioning equipment, the condensing element of such equipment being mounted in front of the cooling radiator of the engine. The air flowing through the condensing element is heated thereby and then flows through the cooling radiator of the engine, thereby influencing the cooling characteristics of the radiator. Accordingly, the size of the cooling fan and its speed of rotation have been increased to provide adequate volume of cooling air. As a result, the parasitic load on the engine has been increased and the noise of fan operation has risen to an objectionable level.

To compensate for these effects the cooling fan of the engine is provided with a fluid coupling device having temperature responsive means controlled either by the temperature of the air flowing through the radiator or by the temperature of the water circulating through the engine cooling system. Such temperature responsive means are, of course, mounted externally with relation to the coupling housing itself. The degree of coupling between the fan and the engine is controlled by the temperature responsive means to provide substantially direct coupling of the fan to the engine when the air or the cooling water is at relatively high temperatures and to effect a certain degree of slip within the coupling to drive the fan at lower than normal speeds when the temperature of the air or cooling water is relatively low. These temperature variable couplings have the advantage of decreasing the power supplied to the fan by the engine when less air is needed for cooling purposes.

Depending upon the type of response desired, the temperature responsive means may be located within the coupling housing and under such conditions the action and function of the temperature responsive means is substantially the same as that of the externally mounted temperature responsive means referred to above. This temperature responsive type of variable coupling, in addition to the advantages pointed out above, also results in a minimum of fan noise since the fan speed is reduced except when necessary to provide proper heat exchange.

In conventional devices of the type referred to above, for a given input speed to the coupling the fan speed or degree of coupling increases with increases in the temperature of the medium ambient to the element along a characteristic curve. For increased input speeds this characteristic curve attains a somewhat increased slope, but the variation in slope of the characteristic curve for increased input speeds is not pronounced. Under certain operating conditions it is highly desirable that, for increased input speeds, the rate of change of fan speed or degree of coupling decrease with increases in the air temperature ambient to the thermally responsive element of the coupling.

Heretofore, in couplings of the type referred to above, the conditions responsive control of the degree of coupling between the driving and driven elements thereof has been accomplished by providing a drive chamber and a storage chamber for the fluid providing the coupling between the active surfaces. An internal pump is utilized for providing a pressure differential between the storage chamber and the drive chamber and a valved aperture is further provided with the valve opening or closing in response to the magnitude of the condition utilized to control the coupling. In such arrangements the pump for transferring fluid between the chambers is operated continuously independently of the magnitude of the condition controlling the valved aperture providing communication between the chambers.

Conventional couplings of the type described herein have been controlled by means of temperature responsive devices such as, bimetallic thermostatic elements. Such control devices are entirely automatic in operation and operate satisfactorily in most applications. However, there are special applications where it may be desirable to provide direct or manual control of the coupling by the operator of the vehicle or engine.

Accordingly, the principal object of this invention is to provide a fluid coupling device for automotive accessory devices, such as fans, generators, and the like, wherein the degree of coupling may be controlled remotely by various types of electrical devices.

A further object of this invention is to provide a fluid coupling for automotive accessory devices wherein control of the degree of coupling may be accomplished by means of a magnetic device for actuating a fluid transfer pump or valve located within the coupling device.

In accordance with this invention there is provided a fluid coupling comprising a casing having a fluid storage chamber therein and a drive chamber enclosing a drive disc, a fluid transfer means operable to effect transfer of fluid between said storage chamber and said drive chamber, and magnetic means for actuating said transfer means to transfer fluid from said storage chamber to said drive chamber or vice versa.

The full nature of the invention will be understood from the accompanying drawings and the following description and claims:

Figure 1:
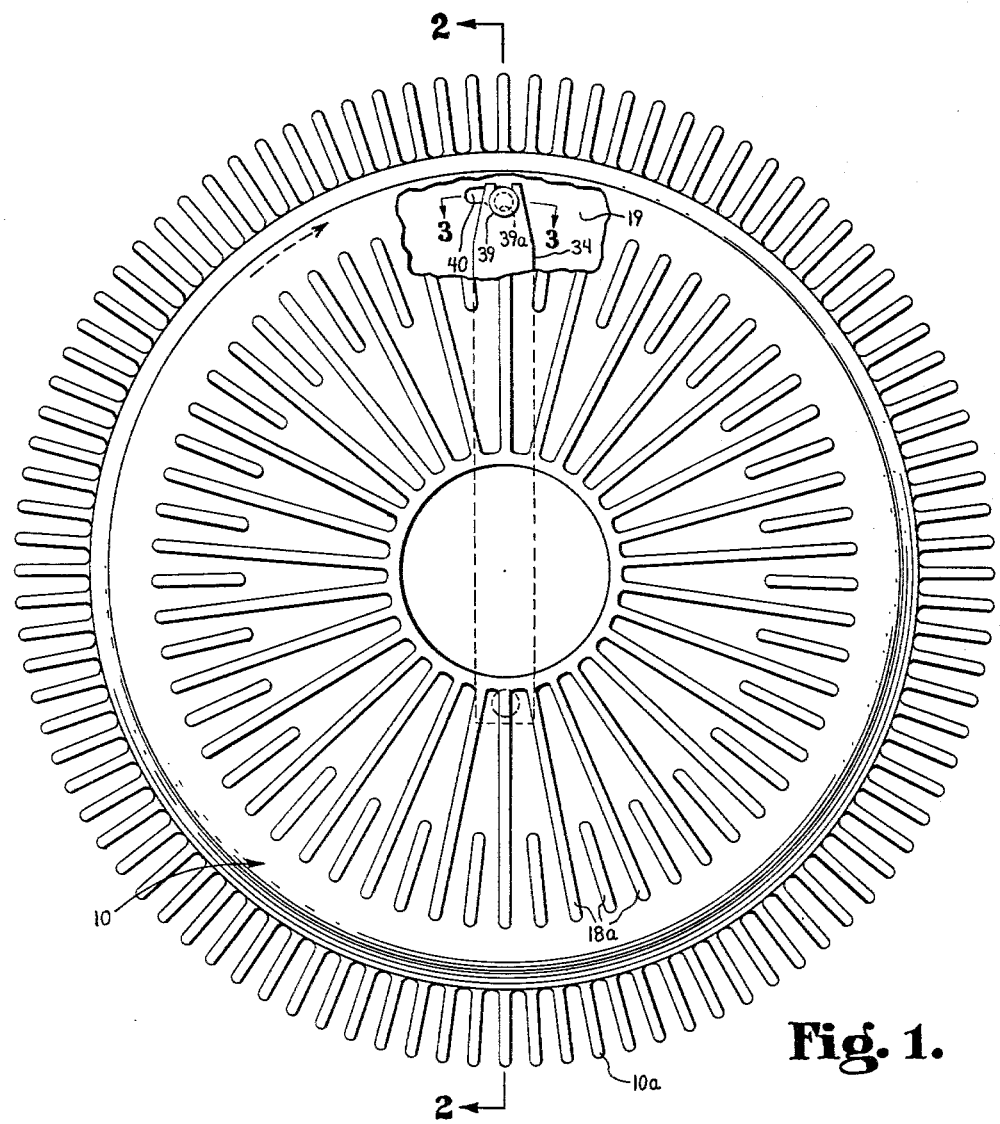
FIG. 1 is a front view of a fluid coupling embodying the present invention with a portion broken away to illustrate the internal construction.

Referring initially to FIGS. 1, 2, 3, 3A and 4, the invention is embodied in a fluid coupling assembly comprising a casing member 10 having a hub 11 for rotatably mounting the casing on a drive shaft 12, there being a bearing 14 and seals 14a for supporting the casing on the shaft. Shaft 12 may be integrally connected with a coupling flange 15 for coupling the drive shaft 12 to any conventional rotating part of an internal combustion engine. If the coupling unit is utilized for driving a cooling fan, the fan may be bolted to casing 10 by means of bolts threadedly engaging a plurality of radially disposed threaded bores 16 and the member 15 may be connected to the pulley which conventionally drives the engine water pump.

Casing 10 is provided with a cover member 18, the peripheral edges of which engage the peripheral edges of a divider plate 19 (FIG. 2) seated on an annular surface 20 formed adjacent the periphery of casing 10. Cover member 18 and plate 19 may be clamped to casing member 10 by means of an annular flange member 21 swaged or otherwise formed into pressure engagement with the outer peripheral surface of the cover 18. The outer face of cover member 18 is provided with heat dissipating ribs or projections 18a and the peripheral portion of casing 10 is also provided with heat dissipating vanes 10a. The cover 18 is formed and mounted to establish spaced relationship with respect to the divider plate 19 thus providing a fluid reservoir 23 between the cover 18 and plate 19.

The casing 10 is formed to provide a recess inwardly of plate 19 to thereby define a drive chamber 24 within which is mounted the drive disc 26 press-fitted or otherwise fixed upon the shaft 12. The peripheral portions of the disc 26 are covered with arcuate facing members 28 and 51 which may be spaced from one another, as shown in FIG. 3A, to provide grooves or channels 30 extending between the outer portion of the facing members 28 and 51 inwardly across the entire width of the facing members. Located adjacent the inner margins of the facing members 28 are a series of uniformly distributed ports 32 which extend completely through the disc 26. The grooves 30, together with the ports 32, provide toroidal circulation of fluid about the peripheral portion of the plate 26 as is fully described and claimed in my United States Letters Patent No. 2,879,755 granted March 31, 1959.

A pump means for transferring fluid between the reservoir 23 and the drive chamber 24 comprises an abutment member 39. The abutment member 39 may, for example, be of cylindrical configuration and extends into, but is movable within an aperture 39a in the plate 19. It will be obvious that other configurations of member 39 may be utilized. As will be evident from FIG. 1, the aperture 39a includes a further aperture portion forming a port 40 which provides fluid communication between the reservoir 23 and the drive chamber 24. It will be noted that the abutment member 39 is positioned closely adjacent the port 40 but trails the port in the direction of rotation of the plate 19 wih relation to the drive disc 26. While rotation of the casing, the plate 19 and the drive disc 26 is clockwise as viewed in FIG. 1 and as there indicated by an arrow in broken lines, and since the plate 19 and the casing lag the drive disc in speed, the rotation of plate 19 and the casing relative to the drive disc 26 is counter-clockwise.

Means are provided for movably supporting the abutment 39 and this includes a resilient element taking the form of the blade 34 rigidly attached by a rivet 35 or other suitable means to the plate 19. The free end of the blade 34 is notched and extends into a circumferential groove in the abutment 39 thereby providing a motion transmitting connection between the blade 34 and the abutment.

Mounted opposite the exterior face of the cover 18 and coaxially therewith is a power unit 42 which may comprise any conventional type of thermostatic device or hydraulic device or manually operable mechanism which may be controlled from a remote point. A permanent magnet 43 may be attached to the power unit for movement therewith by a shaft 44. The assembly 42, 43, 44 may be supported from some portion of the engine by a bracket indicated schematically at 45.

Figure 2:
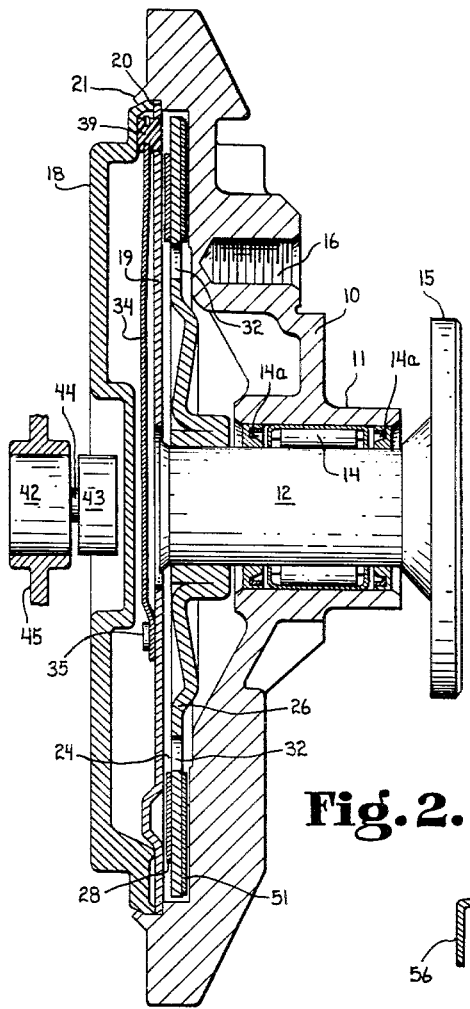
FIG. 2 is a side sectional view taken generally along the line 2—2 of FIG. 1.

When the power unit 42 is a thermostatic device it will be arranged to provide movement of magnet 43 outwardly of the casing when ambient temperatures increase. The same is true when a hydraulic or a remotely controlled manually operable mechanism is employed as a power unit. As will be evident from FIG. 2, the mounting of the blade 34 is such that its inherent resiliency urges it toward the right (FIG. 2). However, magnet 45 is positioned and arranged to create a magnetic field such that blade 34 is normally held in the position indicated in FIG. 2.

In operation, the reservoir 23 is filled with a fluid such, for example, as an oil to a degree sufficient to fill the spaces in chamber 24 between the opposing surfaces of the facings 28 and 51 and the adjacent walls of plate 19 and casing 10. A somewhat greater volume of fluid than this minimum quantity is, of course, preferred so that fluid may flow through the apertures 32 providing the toroidal heat dissipating circulation of fluid previously mentioned. With the casing rotating, centrifugal force will distribute the fluid to a uniform level within the reservoir 23 and the drive chamber 24, the fluid passing freely through the port 40. It will be understood that the rotational speed of the casing 10 as compared to the rotational speed of the shaft 12, that is, the degree of coupling between the two, is dependent upon the amount of fluid in the chamber 24.

Figure 3:
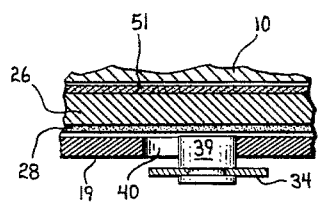
FIG. 3 is an enlarged fragmentary view taken generally along the line 3—3 of FIG. 1.
Figure 3A:
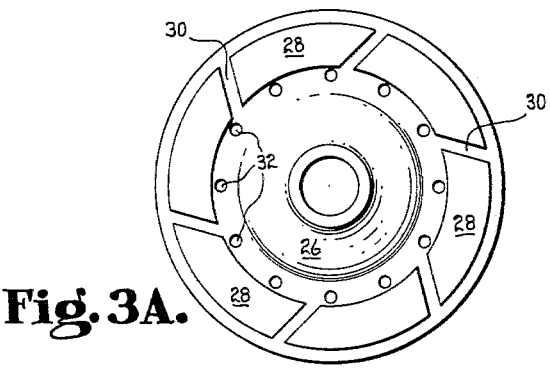
FIG. 3A is a side elevation view of the drive disc employed in the coupling of this invention.

Assuming that the power unit 42 is a thermostatic device and assuming that the temperature ambient thereto is relatively high, indicating that a maximum degree of coupling between the casing and the shaft 12 is desirable, the power unit 42 will position magnet 43 to attract blade 34 whereby the abutment 39 will be in the position shown in FIG. 2 and in enlarged detail in FIG. 3. Under these conditions, the face of the abutment 39 does not extend beyond the rightward (as viewed in FIG. 2) face of the plate 19 and does not extend into the path of fluid in the drive chamber. The pumping means formed by the abutment 39 is thus in an inactive position and centrifugal force maintains the fluid level uniform within the chamber 24 and the reservoir 23, the chamber 24, under these conditions, having maximum fluid therein and therefore the degree of coupling between the shaft 12 and the casing 10 is relatively high.

Should the temperature ambient to the power unit 42 decrease, indicating that a decreased degree of coupling between the shaft 12 and the casing 10 is desirable, the power unit will move magnet 43 to the left (as viewed in FIG. 2), thereby decreasing the magnetic attraction on blade 34 and thereby allowing the blade 34 to move toward the right. Abutment 39 moves therewith and is positioned so that it extends from the surface of plate 19 into the drive chamber 24 and into the path of fluid.

With the abutment member 39 in a position such that it extends into the drive chamber, the abutment will act as an impact type pump and will raise the fluid pressure in an area just ahead of, or leading, the abutment. The consequent increase in pressure in this area will drive or pump fluid from the drive chamber 24 through the port 40 and into the reservoir 23. The volume of fluid in the drive chamber 24 will thus be reduced and, as a result, the degree of coupling between the shaft 12 and the casing 10 will also be reduced. Movement of the abutment 39 to its position of extension into the drive chamber 24 thus places the pumping means in an active position in which it is capable of removing fluid from the drive chamber 24 and transferring it through the port 40 into the reservoir 23.

It will also be readily understood that if power unit 42 is hydraulically operated or manually operated, the magnet 43 may be controlled as to its position to effect any desired degree of coupling between the shaft 12 and the casing 10.

Figure 4:
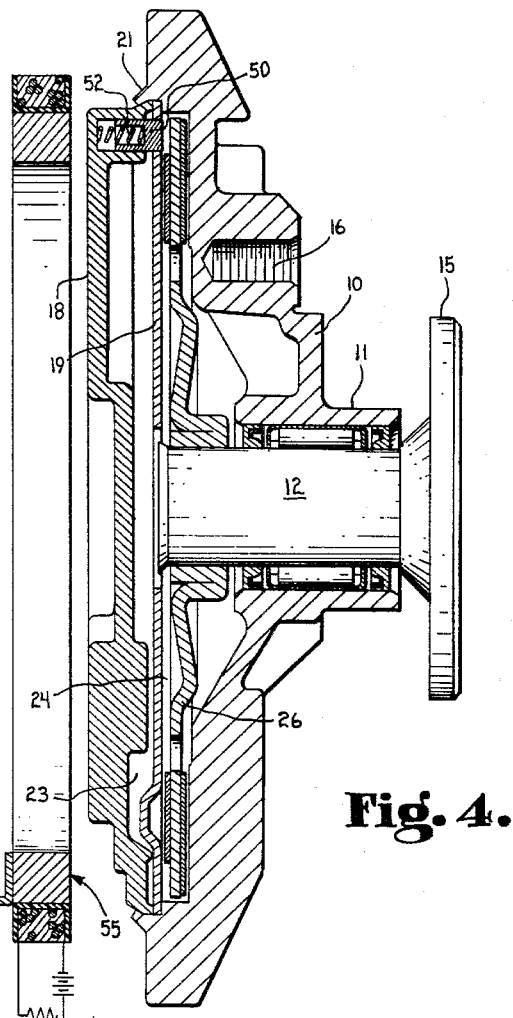
FIG. 4 is a sectional view similar to FIG. 2 and illustrating a modification of this invention.

FIG. 4 of the drawings illustrates a modified form of the coupling shown in FIGS. 1, 2, 3 and 3A and parts thereof identical to those shown in FIGS. 1, 2, 3 and 3A are identified by identical reference characters. In this modification of the invention an abutment member 50 corresponding to abutment member 39 of FIG. 2, for example, is slidably mounted in a bore formed in the outer periphery of cover 18 as indicated in FIG. 4, and is normally biased to the right (FIG. 4) by a compressed coil spring 52. An electromagnet 55 may be mounted on a bracket 56 attached to the engine or other suitable structure, exteriorly of cover 18 but immediately adjacent to the abutment 50. The electromagnet 55 may be energized and deenergized to move the abutment member 50 to the left or to the right for effecting any desired degree of coupling between the shaft 12 and the casing 10. The energizing circuit for magnet 55 may be controlled thermostatically or manually, as indicated schematically at 57, for controlling the degree of coupling. It will be understood that the abutment 50 will be formed of magnetic material so as to respond to the magnetic field created by electromagnet 55.

The invention claimed is:

1. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate, said abutment member being movable between an active position in which it extends from the surface of said plate into said drive chamber and an inactive position wherein it is withdrawn from said drive chamber, a magnetically responsive element movably mounted within said casing and having a portion cooperating with said abutment member for movement thereof, temperature responsive means mounted exteriorly of said outer casing and including a permanent magnet attached thereto for creating a magnetic field within said casing for positioning said element and controlling the position of said abutment member for varying the degree of coupling of said casing and said disc with changes in temperature ambient to said temperature responsive means.

2. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate, said abutment member being movable between an active position in which it extends from the surface of said plate into said drive chamber and an inactive position wherein it is withdrawn from said drive chamber, temperature responsive means mounted exteriorly of said outer casing and having magnetic means operatively associated with said abutment member for magnetically controlling the position of said abutment member and varying the degree of coupling of said casing and said disc in accordance with changes in temperature ambient to said temperature responsive means.

3. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said drive means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port, said abutment member being movable between an active position in which it extends from the surface of said plate into said drive chamber and an inactive position wherein it is withdrawn from said drive chamber, a power unit including a movable member mounted exteriorly of said outer casing, a permanent magnet mounted on said movable member and magnetically coupled with said abutment member to exert variable forces thereon to shift said abutment member between its active and inactive positions, said force varying with movement of said magnet by said power unit for varying the degree of coupling of said casing and said disc.

4. A fluid coupling device comprising a drive shaft, driven means comprising an outer casing and divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, a port providing fluid communication between said reservoir and said drive chamber for filling the spaces between said shear surfaces with fluid from said reservoir to create fluid drive coupling of said casing and said disc, the degree of coupling separating the space within said casing into a fluid reserdrive chamber, a pump means for transferring fluid between said chamber and said reservoir through said port, said pump means comprising an abutment member slidably supported in said outer casing adjacent to said port and trailing said port in the direction of rotation of said plate relative to said drive disc, said abutment member including spring biasing means for normally moving said abutment member into an active position in which it extends into the path of the fluid in the drive chamber, and an electromagnet mounted adjacent said casing in magnetic relation with said abutment member for normally holding said abutment member in an inactive position wherein it was withdrawn from said fluid path, and means for controlling the energization of said electromagnet for shifting said abutment member between its said positions, whereby fluid may be transferred between said drive chamber and said storage chamber in response to actuation of said electromagnet to thereby vary the degree of coupling between said casing and said disc.

5. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, a port providing fluid communication between said reservoir and said drive chamber for filling the spaces between said shear surfaces with fluid from said reservoir to create fluid drive coupling of said casing and said disc, the degree of coupling therebetween varying with the volume of fluid in said drive chamber, a pump means within said casing for transferring fluid between said chamber and said reservoir through said port, and magnetic means for operating said pump means to thereby vary the degree of coupling of said casing and disc in response to changes in said condition.

References Cited by the Examiner

UNITED STATES PATENTS

| 2,939,560 | 6/1960 | Selden | 192—58 |
| 3,090,548 | 5/1963 | Sargeant et al. | 192—21.5 X |
| 3,135,370 | 6/1964 | Sutton | 192—58 |
| 3,184,024 | 5/1965 | Aschauer | 192—103 |

DAVID J. WILLIAMOWSKY, *Primary Examiner.*

DON A. WAITE, *Examiner.*

A. T. McKEON, *Assistant Examiner.*